Patented June 25, 1940

2,205,394

UNITED STATES PATENT OFFICE 2,205,394

SPRAY COMPOSITION

Gerald H. Coleman and Clarence L. Moyle, Midland, Mich., assignors to The Dow Chemical Company, Midland, Mich., a corporation of Michigan No Drawing. Application August 17, 1938, Serial No. 225,416

12 Claims. (Cl. 167—24)

This invention concerns compositions particularly adapted for combating flies, mosquitoes, moths, and similar insects.

Petroleum distillate sprays containing extracts of such insecticidal plant products as pyrethrum flowers, derris, cubé, barbasco, and the like, are widely used for the control of household insect pests. Pyrethrin-containing sprays have a quick paralyzing action on flies, but generally speaking the kill obtained thereby is low compared to the per cent knockdown. Rotenone-containing compositions give a more permanent control, but are relatively slow in their action, requiring a considerable period of time to kill insect pests contacted therewith. Both of the above-mentioned toxicants also suffer from the disadvantage that they are unstable to heat and light, and upon storage lose their effectiveness to a considerable degree.

We have discovered that when a small amount of an aryloxy-halo-dialkyl-ether is added to solutions of insecticidal plant products containing such toxicants as pyrethrin and rotenone, improved fly spray compositions are obtained which are more stable to heat and light and have a greater paralyzing effect and greater lethal effect on insects than the original extract-containing compositions. These sprays give a kill on flies and related insects which more closely approximates the percentage knockdown of such pests than do common household insecticide sprays heretofore employed. Furthermore, the aryloxy-halo-dialkyl ethers are efficient substitutes for the extracts of insecticidal plant products in spray compositions, solutions of such synthetic ether compounds comparing favorably in toxic effect with the plant extracts and having the added advantage of being substantially colorless and odorless, and being completely stable to heat, light, and air.

When the aryloxy-halo-dialkyl ether is used alone as the toxicant in an insect spray composition, a concentration from about 2 to about 10 per cent in an inert organic solvent is satisfactory. For use in stabilizing and/or fortifying the common fly spray compositions comprising pyrethrin or rotenone, the aryloxy-halo-dialkyl ether is employed in amount of from about 0.5 to 3 grams per 100 milliliters of the spray solution. The term "aryloxy," as herein employed, refers to aromatic-oxy radicals generally as obtained by the elimination of hydrogen from the hydroxyl groupings of monohydric phenols.

The aryloxy-halo-dialkyl ethers we have found particularly valuable as insecticidal toxicants and stabilizers for pyrethrin- and rotenone-containing spray compositions are those having the following formula

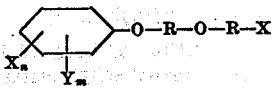

wherein each R represents an alkyl residue containing not more than 3 carbon atoms, each X represents halogen, Y represents hydrogen or an alkyl group containing not more than 6 carbon atoms, $n$ is an integer not greater than 5, and $m$ is an integer not greater than 2. The above compounds may be prepared by reacting a halophenol or alkyl-halo-phenol with dihalo-dialkyl ether, e. g., beta-beta'-dichloro-diethyl ether, beta-chloro-beta'-bromo-diethyl ether, gamma-gamma'-dibromo-dipropyl ether, or the like, in the presence of water and a suitable alkali, e. g., NaOH, KOH, etc. Applications, Serial Nos. 225,414 and 225,415, filed concurrently herewith, disclose in detail the preparation and properties of a large number of these compounds. The aryloxy-chloro-ethers falling within the scope of the above formula have been found to be substantially odorless, colorless, and comparatively innocuous as regards their effect upon human beings and warm blooded animals. Particularly advantageous is the fact that they do not cause irritation and dermatitis upon contact with living tissue and skin.

The method employed in determining the insecticidal toxicities of solutions of the above compounds and combinations thereof with pyrethrin and rotenone is substantially that described in Soap, 8, No. 4, 1932 known as the Peet-Grady method. Knockdown and mean mortality figures as shown in the subsequent examples for the most part represent averages of results obtained in a series of runs for the particular compositions concerned. The terms "per cent" and "percentage" as employed in the specification and claims, with reference to the composition of various spray materials, refer to grams per 100 milliliters thereof. For purpose of comparison, in the examples, a control pyrethrin solution was employed consisting of the extract of the toxic principles from 1 pound of pyrethrum flowers dissolved in 1 U. S. gallon of a petroleum distillate having a boiling range of 345°–508° F. and a flash point of 137° F.

The invention is illustrated by the following examples:

Example 1

Beta-(2,4,6—trichloro-phenoxy)-beta'-chloro-diethyl ether (boiling at 168°–170° C. at 4 mm.

pressure and having the specific gravity 1.412 at 20°/4° C.) was dissolved in the petroleum distillate employed in the preparation of the control solution in amount sufficient to give 2, 3, and 4 per cent solutions. These solutions were employed as spray compositions against three-day old house flies according to the Peet-Grady method, whereby the following results were obtained:

| Percentage toxicant in oil | Knock-down in 10 minutes | Mean mortality in 48 hours |
|---|---|---|
| 2 | 53 | 36 |
| 3 | 92 | 66 |
| 4 | 94 | 80 |
| Control solution | 100 | 53 |

The test solutions were substantially odorless, non-irritating, and colorless, and did not decompose or deteriorate on storage and exposure to light and air.

*Example 2*

A 2 per cent solution of beta-(2,4,6-trichlorophenoxy)-beta'-chloro-diethyl ether in the pyrethrin-containing control solution was prepared and tested substantially as described in Example 1. This spray material knocked down 100 per cent in 10 minutes, killed 83 per cent of the flies in 48 hours, and was non-irritating to the nasal passages of humans. A portion of the above composition was compared with the control solution to determine the resistance of the two materials to decomposition upon exposure to air and light. After one week exposure, the control solution was found to knock down 96 per cent and to kill 36 per cent of the test flies in 48 hours. The combination of the control solution and 2 per cent of the synthetic ether compound knocked down 99 per cent of the test insects in 10 minutes and killed 77 per cent in 48 hours after a similar exposure.

*Example 3*

Other aryloxy-halo-dialkyl ethers were tested by the Peet-Grady method to determine their efficiency as fly spray toxicants. The data set forth in the following table is representative of that obtained from 3 per cent solutions of such toxicants.

beta'-chloro-diethyl ether, boiling at 166°–170° C. at 3 millimeters pressure and having the specific gravity 1.151 at 20°/4° C.; and beta-(2,6-dichloro-4-tertiarybutyl-phenoxy)-beta'-chloro-diethyl ether, boiling at 179°–180° C. at 4 millimeters pressure and having a specific gravity of 1.229 at 20°/4° C. Other compounds which may similarly be employed include beta-(2,4,6-trichloro-phenoxy)-beta'-bromo-diethyl ether, beta-(2,4,6-tribromo-phenoxy)-beta'-bromo-diethyl ether, beta-(2-iodo-4-methyl-phenoxy)-beta'-chloro-diethyl ether, beta-(3-chloro-phenoxy)-beta'-iodo-diethyl ether, beta-(2,4,6-trichloro-3,5-dimethyl-phenoxy)-beta'-chloro-diethyl ether, beta-(pentachloro-phenoxy)-beta'-chloro-diethyl ether, beta-(2,4,5,6-tetrachloro-3-methyl-phenoxy)-beta'-chloro-diethyl ether, beta-(2-bromo-4-normal-amyl-phenoxy)-beta'-bromo-diethyl ether, beta-(2-chloro-4-tertiary-butyl-phenoxy)-beta'-chloro-diethyl ether, gamma-(2,4,6-trichloro-phenoxy)-gamma'-chloro-dipropyl ether, beta-(2-bromo-4-methyl-phenoxy)-beta'-chloro-ethylpropyl ether, beta-(2,4,6-trichloro-phenoxy)-beta'-bromo-dipropyl ether, beta-(2-methyl-4-tertiarybutyl-6-chloro-phenoxy)-beta'-chloro-diethyl ether.

Mixtures of the above compounds may be dissolved in suitable solvents to obtain liquid spray materials having desirable characteristics as regards insecticidal toxicities, speed and percentage of knockdown and kill, and stability to light and heat. Likewise, the aryloxy-halo-dialkyl ethers may be employed as stabilizers with extracts of derris, cubé, barbasco, and other insecticidal plant products. Besides petroleum distillates, other organic solvents, such as benzene, ethylene dichloride, hydrogenated naphthalene, butyl alcohol, etc., may be employed provided only that such solvents be inert with respect to the toxicants employed, non-injurious to humans, and capable of dissolving the insecticidal plant products and/or aryloxy-halo-dialkyl ethers in the required amounts.

The phrase "non-corrosive organic solvent" as employed in the following claims refers to any organic solvent material unreactive with, and capable of dissolving the toxicants hereinbefore described, and non-injurious to the skin and general health of humans.

| Compound | Per cent knockdown in 10 minutes | Per cent mortality in 48 hours |
|---|---|---|
| Beta-(2-chloro-phenoxy)-beta'-chloro-diethyl ether (boiling point 135°–136° C. at 2 mm. pressure) | 96 | 23 |
| Beta-(2,4-dichloro-phenoxy)-beta'-chloro-diethyl ether (boiling point 148°–149° C. at 1.5 mm. pressure) | 63 | 53 |
| Beta-(2,4,5-trichloro-phenoxy)-beta'-chloro-diethyl ether (melting point 60° C.) | 80 | 47 |
| Beta-(2,4-dibromo-phenoxy)-beta'-chloro-diethyl ether (boiling point 196°–201° C. at 6 mm. pressure) | 90 | 54 |
| Beta-(2-bromo-4-chloro-phenoxy)-beta'-chloro-diethyl ether (density 1.54 at 25°/25° C.) | 74 | 46 |
| Beta-(4-bromo-2,6-dichloro-phenoxy)-beta'-chloro-diethyl ether (density 1.60 at 25°/25° C.) | 45 | 32 |
| Beta-(2-bromo-4,6-dichloro-phenoxy)-beta'-chloro-diethyl ether (density 1.58 at 25°/25° C.) | 82 | 53 |
| Beta-(4-bromo-2-methyl-phenoxy)-beta'-chloro-diethyl ether (density 1.43 at 25°/25° C.) | 88 | 60 |
| Beta-(2,4-dichloro-6-methyl-phenoxy)-beta'-chloro-diethyl ether (specific gravity 1.299 at 20°/4° C.) | 56 | 42 |

By substituting other aryloxy-halo-dialkyl ethers for those disclosed in the foregoing examples, insecticidal compositions may be obtained of comparable efficiency in the control of household and related insect pests. Representative of such compounds are beta-(4-chloro-phenoxy)-beta'-chloro-diethyl ether, a water-white, mobile liquid boiling at 156°–159° C. at 3 millimeters pressure and having a specific gravity of 1.250 at 20°/4° C.; beta-(2-chloro-4-tertiarybutyl-phenoxy)-

Other modes of applying the principle of our invention may be employed instead of those explained, change being made as regards the materials or the amounts thereof employed, provided the compositions defined by any of the following claims or their equivalent be employed.

We therefore particularly point out and distinctly claim as our invention:

1. An insecticidal spray comprising as its principal toxic ingredient an aryloxy-halo-dialkyl ether dissolved in a non-corrosive organic solvent.

2. An insecticidal spray comprising a non-corrosive organic solvent having dissolved therein a product selected from the class consisting of the extracts of pyrethrin- and rotenone-bearing plants and as an added toxicant and stabilizer an aryloxy-halo-dialkyl ether.

3. An insecticidal spray comprising a non-corrosive organic solvent having dissolved therein a product selected from the class consisting of the extracts of pyrethrin- and rotenone-bearing plants and as an added toxicant and stabilizer an aryloxy-halo-dialkyl ether in amount ranging between 0.5 and 10 grams per 100 milliliters thereof.

4. An insecticidal spray comprising a petroleum distillate having dissolved therein as the principal toxic ingredient a compound having the formula

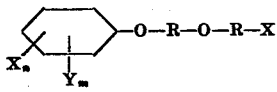

wherein each R represents an alkyl residue containing not more than 3 carbon atoms, each X represents halogen, Y represents a member of the group consisting of hydrogen and alkyl radicals containing not more than 6 carbon atoms, $n$ is an integer not greater than 5, and $m$ is an integer not greater than 2.

5. An insecticidal spray comprising a petroleum distillate solution of a product selected from the class consisting of the extracts of pyrethrin- and rotenone-bearing plants, and as an additional toxicant and stabilizer a compound having the formula

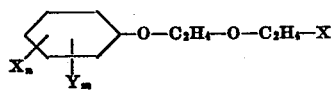

wherein each X represents halogen, Y represents a member of the group consisting of hydrogen and alkyl groups containing not more than 6 carbon atoms, $n$ is an integer not greater than 5, and $m$ is an integer not greater than 2.

6. An insecticidal spray comprising a petroleum distillate solution of an insecticidal product selected from the class consisting of the extracts of pyrethrin- and rotenone-bearing plants and as an additional toxicant and stabilizer therein a beta-(halo-phenoxy)-beta'-chloro-diethyl ether having the formula

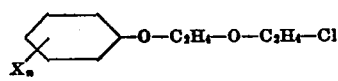

wherein X represents halogen, and $n$ is an integer not greater than 5, in amount ranging between 0.5 and 10 grams per 100 milliliters thereof.

7. An insecticidal spray comprising a petroleum distillate solution of an insectical product selected from the class consisting of the extracts of pyrethrin- and rotenone-bearing plants, and as an additional toxicant and stabilizer therein a beta-(alkyl-halo-phenoxy)-beta'-chloro-diethyl ether having the formula

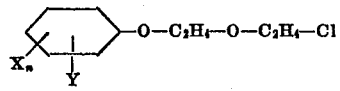

wherein X represents halogen, Y represents an alkyl group containing not more than 6 carbon atoms, and $n$ is an integer not greater than 4, in amount ranging between 0.5 and 10 grams per 100 milliliters thereof.

8. An insecticidal spray comprising as its principal toxic ingredient beta-(2,4,6-trichloro-phenoxy)-beta'-chloro-diethyl ether dissolved in a non-corrosive organic solvent.

9. An insecticidal spray comprising a petroleum distillate solution of an insecticidal product selected from the class consisting of the extracts of pyrethrin- and rotenone-bearing plants, and as an additional toxicant and stabilizer beta-(2,4,6-trichloro-phenoxy)-beta'-chloro-diethyl ether dissolved therein.

10. An insecticidal spray comprising a petroleum distillate solution of an insecticidal product selected from the class consisting of the extracts of pyrethrin- and rotenone-bearing plants, and as an additional toxicant and stabilizer beta-(2,4,6-trichloro-phenoxy)-beta'-chloro-diethyl ether dissolved therein in amount ranging between 0.5 and 10 grams per 100 milliliters thereof.

11. An insecticidal spray comprising a petroleum distillate solution of an extract of a pyrethrin-bearing plant, and as an additional toxicant and stabilizer therein beta-(2,4,6-trichloro-phenoxy)-beta'-chloro-diethyl ether in amount ranging between 0.5 and 10 grams per 100 milliliters thereof.

12. An insecticidal spray comprising a non-corrosive organic solvent having dissolved therein as the principal toxic ingredient a compound having the formula:

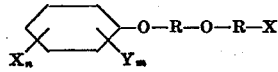

wherein each R represents an alkyl radical containing not more than 3 carbon atoms, each X represents halogen, Y represents a member of the group consisting of hydrogen and alkyl radicals containing not more than 6 carbon atoms, $n$ is an integer not greater than 5, and $m$ is an integer not greater than 2.

GERALD H. COLEMAN.
CLARENCE L. MOYLE.